US006934328B1

(12) United States Patent
Halder

(10) Patent No.: US 6,934,328 B1
(45) Date of Patent: Aug. 23, 2005

(54) RELAXED, MORE OPTIMUM TRAINING FOR MODEMS AND THE LIKE

(75) Inventor: Bijit Halder, Mountain View, CA (US)

(73) Assignee: Virata Corporation, Santa Clara, CA (US)

( * ) Notice: Subject to any disclaimer, the term of this patent is extended or adjusted under 35 U.S.C. 154(b) by 673 days.

(21) Appl. No.: 09/639,515

(22) Filed: Aug. 15, 2000

(51) Int. Cl.$^7$ .......................... H03H 7/30; H03H 7/40; H03K 5/159
(52) U.S. Cl. ...................... 375/232; 708/323
(58) Field of Search ............... 375/229–234, 375/219, 222, 350; 708/322, 323

(56) References Cited

U.S. PATENT DOCUMENTS

| | | | | |
|---|---|---|---|---|
| 5,247,541 A | * | 9/1993 | Nakai | 375/233 |
| 5,398,259 A | * | 3/1995 | Tsujimoto | 375/233 |
| 5,539,774 A | * | 7/1996 | Nobakht et al. | 375/232 |
| 5,581,585 A | | 12/1996 | Takatori et al. | |
| 5,757,855 A | * | 5/1998 | Strolle et al. | 375/262 |
| 5,909,426 A | | 6/1999 | Liau et al. | |
| 6,393,073 B1 | * | 5/2002 | Eilts | 375/340 |
| 6,643,676 B1 | * | 11/2003 | Slock et al. | 708/322 |

FOREIGN PATENT DOCUMENTS

| | | |
|---|---|---|
| EP | 0428129 | 11/1989 |
| EP | 0880253 | 11/1998 |
| WO | WO 99/39443 | 8/1999 |

OTHER PUBLICATIONS

Neeser, Jun. 15, 1992, Derwent Publication No. CH000680100A5, Abstract.*
Falconer, David D, and Ljung, Lennart, "Application of Fast Kalman Estimation to Adaptive Equalization," IEEE Trans. on Comm., COM–26, No. 10 (Oct. 1978).
Gitlin, Richard D; Hayes, Jeremiah F.; and Weinstein, Stephen B., "Data Communications Principles," Chapter 8, pate 591 (1992).

* cited by examiner

Primary Examiner—Jean B. Corrielus
(74) Attorney, Agent, or Firm—Burns, Doane, Swecker & Mathis, L.L.P.

(57) ABSTRACT

A high-speed broadband, wireline modem including an adaptive equalizer having both a training mode and a decision-directed non-training mode. The adaptive equalizer comprising at least one of a forward path coupled to receive signal samples, the forward path including a forward filter and a decision element, and a feedback path coupled between an output of the decision element and an input of the decision element, the feedback path including a feedback filter; and means for adapting the one of said forward filter and said feedback filter based on a least squares error criterion performed substantially according to a predetermined algorithm.

12 Claims, 8 Drawing Sheets

| Step | Update Equation | # of Mul |
|---|---|---|
| 1 | $e \leftarrow eps_2 + A_f^T X_f$ | $mN$ |
| 2 | $A_f \leftarrow A_f - K_f e^T$ | $mN$ |
| 3 | $e_p \leftarrow eps_2 + A_f^T X_f$ | $mN$ |
| 4 | $E_f \leftarrow \lambda E_f + e_p e^T$ | $2m^2$ |
| 5 | $b_n \leftarrow K_f + A_f E_f^{-1} e_p$ | $m^3 + m^2 + mN$ |
| 6 | $c_n \leftarrow E_f^{-1} e_p$ | $m^2$ |
| 7 | $m \leftarrow [c_n(1:2); b_n(1:N_{ff}-2); c_n(3); b_n(N_{ff}+1:N-1)]$ | $0$ |
| 8 | $\mu \leftarrow [b_n(N_{ff}-1:N_{ff}); b_n(N)]$ | $0$ |
| 9 | $X_f \leftarrow [eps_2(1:2); X_f(1:N_{ff}-2); eps_2(3); X_f(N_{ff}+1:N-1)]$ | $0$ |
| 10 | $\eta \leftarrow p_3 + D_f^T X_f$ | $mN$ |
| 11 | $D_f \leftarrow (D_f - m\eta^T)(I - \mu\eta^T)^{-1}$ | $m^2(N+1) + m^3 + mN$ |
| 12 | $K_f \leftarrow m - D_f^T \mu$ | $mN$ |
| 13 | $x_{est} \leftarrow C_f X_f$ | $N$ |
| 14 | error ← decision − $x_{est}$ | $0$ |
| 15 | $C_f \leftarrow C_f +$ error $K_f$ | $N$ |
| Total complexity | | $(m^2+7m+2)N+5m^2+2m^3$ |

*FIG. 4*

| Step | Update Equation | # of Mul |
|---|---|---|
| 1 | $e \leftarrow eps_2 + A_f^T x_f^T$ | $mN$ |
| 2 | $A_f \leftarrow A_f - K_f e^T$ | $mN$ |
| 3 | $e_p \leftarrow e(1 - K_f^T x_f)$ | $N+m$ |
| 4 | $F_f \leftarrow \lambda F_f \, e_p^T$ | $m^2$ |
| 5 | $c_n \leftarrow F_{f1} + e^T F_f e_p$ | $2m(m+1)$ |
| 6 | $F_f \leftarrow F_f - c_n e^T F_f$ | $m(m+1)$ |
| 7 | $b_n \leftarrow K_f + A_f c_n$ | $mN$ |
| 8 | $m \leftarrow [c_n(1:2); b_n(1:N_{ff}-2); t_3(3); b_n(N_{ff}+1:N-1)]$ | 0 |
| 9 | $\mu \leftarrow [b_n(N_{ff}-1:N_{ff}); b_n(N)]$ | 0 |
| 10 | $x_f \leftarrow [eps_2(1:2); x_f(1:N_{ff}-2); eps_2(3); x_f(N_{ff}+1:N-1)]$ | 0 |
| 11 | $\eta \leftarrow p_3 + D_f^T x_f$ | $mN$ |
| 12 | $K_f \leftarrow (m - (D_f \mu))/(1 - \eta^T \mu)$ | $(m+1)N+m$ |
| 13 | $D_f \leftarrow D_f - K_f \eta^T$ | $mN$ |
| 14 | $x_{est} \leftarrow C_f x_f$ | $N$ |
| 15 | $error \leftarrow decision - x_{est}$ | 0 |
| 16 | $C_f \leftarrow C_f + error \, K_f$ | $N$ |
| Total complexity | | $(6m+4)N + 4m^2 + 5m$ |

*FIG. 5*

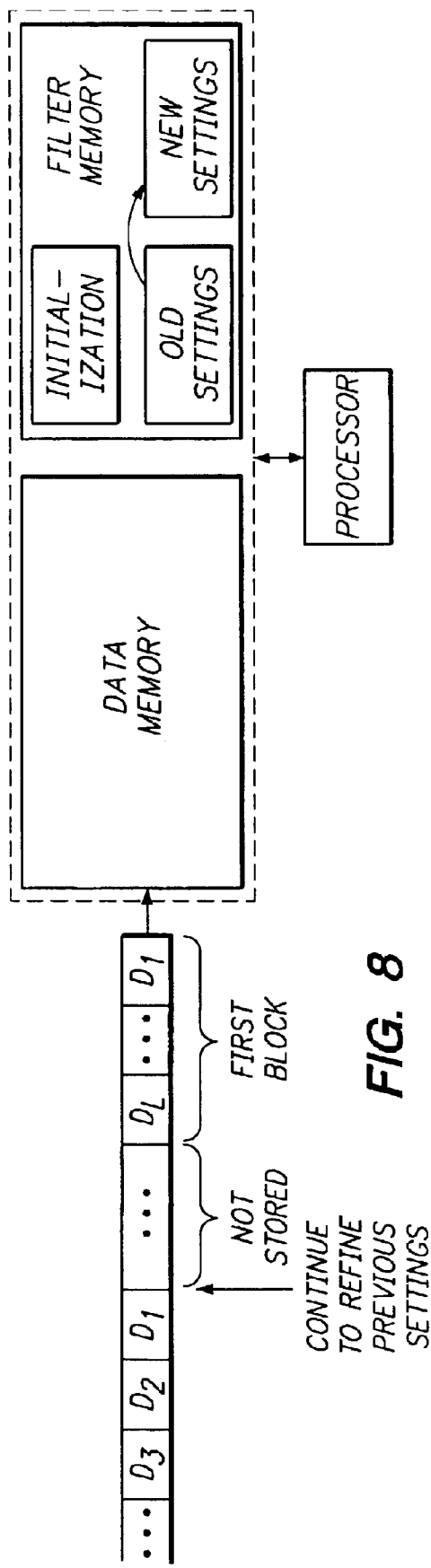

RELAXED, MORE OPTIMUM TRAINING FOR MODEMS AND THE LIKE

BACKGROUND OF THE INVENTION

1. Field of the Invention

The present invention relates to filter adaptation, for example in communications such as wireline communications.

2. State of the Art

Broadband communications solutions, such as HDSL2/G.SHDSL (High-Speed Digital Subscriber Line) are increasingly in demand. The ability to achieve high data rates (e.g., 1.5 Mbps and above) between customer premises and the telephone system central office over existing (unconditioned) telephone lines requires exacting performance. Various components of a high-speed modem that contribute to this performance require training, e.g., a timing section (PLL, or phase lock loop), an adaptive equalizer, an adaptive echo canceller. Typically, these components are all trained in serial fashion, one after another, during an initial training sequence in which known data is transmitted between one end of the line and the other.

Equalization is especially critical for HDSL2/G.SHDSL2 modems, which are required to operate over various line lengths and wire models and wirelines with and without bridge taps, with extremely divergent cross-talk scenarios. In general, intersymbol interference (ISI), which equalization aims to eliminate, is the limiting factor in XDSL communications. Hence, good equalization, characterized by the ability to accurately compute the optimal channel equalizer coefficients at the start-up phase of the modem and adaptively update those coefficients to accommodate any change in the level of cross-talk, is essential to any HDSL2/G.SHDSL system.

Known training methods for high-speed modems suffer from various disadvantages. Existing commercial products invariably use a Least Mean Squares (LMS) training algorithm, which is assumed to converge to an optimal training solution. The LMS algorithm is well-known and has generally been found to be stable and easy to implement. Conventional wisdom holds that the steady-state performance of LMS cannot be improved upon. Despite the widespread use of LMS and its attendant advantages, the adequacy of performance of LMS is being tested by the performance requirements of high-speed modems.

Nor are the alternatives to LMS particularly appealing. Other proposed algorithms have chiefly been of academic interest. The Recursive Least Squares (RLS) algorithm, for example, requires a far shorter training time than LMS (potentially one tenth the training time needed for LMS), but RLS entails exceedingly greater computational complexity. If N is the total number of taps in an adaptive filter, then the complexity of RLS is roughly $N^2$, as compared to 2N for LMS. Also, RLS is less familiar and less tractable, suffering from stability problems.

An improved RLS algorithm ("fast RLS") considerably reduces the computational complexity of RLS, from $N^2$ to 28N. The original fast RLS algorithm is described in Falconer and Ljung, Application of Fast Kalman Estimation to Adaptive Equalization, *IEEE Transaction on Communications*, Vol. COM-26, No. 10, Oct. 1978, incorporated herein by reference. The fast RLS algorithm, however, requires that training be performed on contiguous data symbols. If training is performed "on-line," then a high-performance processor is required to perform training computations at a rate sufficient to keep pace with the data rate, e.g., 1.5 Mbps or greater. Although the computational demand (demand for MIPs) "spikes up" during training, once training is completed, computational demands are modest. If training is performed "off-line" using stored data samples, then the processor need not keep up with the data rate, reducing peak performance requirements. However, a potentially long sequence of training data must be stored to satisfy the requirement of the algorithm for contiguous data, requiring a sizable memory. Again, the memory requirement, like training itself, is transient. Once training has been completed, the need for such a large memory is removed.

Apart from training, because communications channels vary over time, continuous or periodic filter adaptation is required. In the case of rapidly varying channel conditions, as in wireless communications and especially mobile wireless communications, and in the case of especially long filters relative to adaptation processing power, the use of RLS is indicated. In wireline communications, these conditions are typically not present. Even in the demanding case of HDSL2/G.SHDSL, filter lengths are moderate and channel variation can be considered to be slow. To applicant's knowledge, all wireline modems use LMS "on-line" for non-training filter adaptation.

Although the error criteria used by the LMS and RLS algorithms differ, the prevalent mathematical analysis of these algorithms suggests that the algorithms converge to the same solution, albeit at different rates. LMS uses mean squared error, a statistical average, as the error criterion. RLS eliminates such statistical averaging. Instead, RLS uses a deterministic approach based on squared error (note the absence of the word mean) as the error criterion. In effect, instead of the statistical averaging of LMS, RLS substitutes temporal averaging, with the result that the filter depends on the number of samples used in the computation. Although the prevalent mathematical analysis predicts equivalent performance for the two algorithms, the mathematical analysis for LMS is approximate only. Although a mathematically exact analysis of LMS has recently been advanced, the overwhelming complexity of that analysis defies any meaningful insight into the behavior of the algorithm and requires numeric solution.

There remains a need, particularly in high-speed wireline communications, for a filter adaptation solution the overcomes the foregoing disadvantages, i.e., that achieves greater optimality without requiring undue computational resources.

SUMMARY OF THE INVENTION

The present invention, generally speaking, uses adaptation based on a least squares error criterion to improve performance of a wireline modem or the like. In accordance with one aspect of the invention, a high-speed, broadband, wireline modem includes an adaptive equalizer having both a training mode and a decision-directed, non-training mode, the adaptive equalizer including a memory for storing received signal samples; a forward path coupled to receive the signal samples, the forward path including a forward filter and a decision element; a feedback path coupled between an output of the decision element and an input of the decision element, the feedback path including a feedback filter; wherein the combined length of the forward filter and the feedback filter is moderate relative to adaptation processing power; and an adaptation circuit or processor for adapting the forward filter and the feedback filter is based on a least squares error criterion, as distinguished from a least mean squares error criterion. A lower noise floor is thereby achieved. The resulting improved noise margin may be used to "buy" greater line length, better quality of service (QoS), higher speed using denser symbol constellations, greater robustness in the presence of interference or noise, lower-power operation (improving interference conditions) or any combination of the foregoing. In accordance with another aspect of the invention, an adaptation algorithm based on the least squares error criterion is provided for use during training of a high-speed, broadband modem. The algorithm converges to a more optimal solution than LMS. Furthermore, the algorithm achieves a high level of robustness with decreased computational complexity as compared to known algorithms. The algorithm is well-suited for fixed-point implementation. Significantly, unlike known algorithms, the algorithm allows for reinitialization and the use of non-contiguous data. This features allows for a wide spectrum of system initialization strategies to be followed, including strategies in which training of multiple subsystems is interleaved to achieve superior training of multiple subsystems and hence the overall system, strategies tailored to meet a specified computational budget, etc.

BRIEF DESCRIPTION OF THE DRAWINGS

The present invention may be further understood from the following description in conjunction with the appended drawings. In the drawings:

FIG. 4 is a chart summarizing the original RLS-fast algorithm and the computational complexity of the algorithm;

FIG. 5 is a chart summarizing the RLC-fast algorithm and the computational complexity of the algorithm;

FIG. 8 is a diagram illustrating the ability, afforded in accordance with one aspect of the present invention, to operate on discontiguous blocks of data;

FIG. 9 is a diagram illustrating further particulars of the reinitialization FIG. 8;

DETAILED DESCRIPTION OF THE PREFERRED EMBODIMENTS

Figure 1:
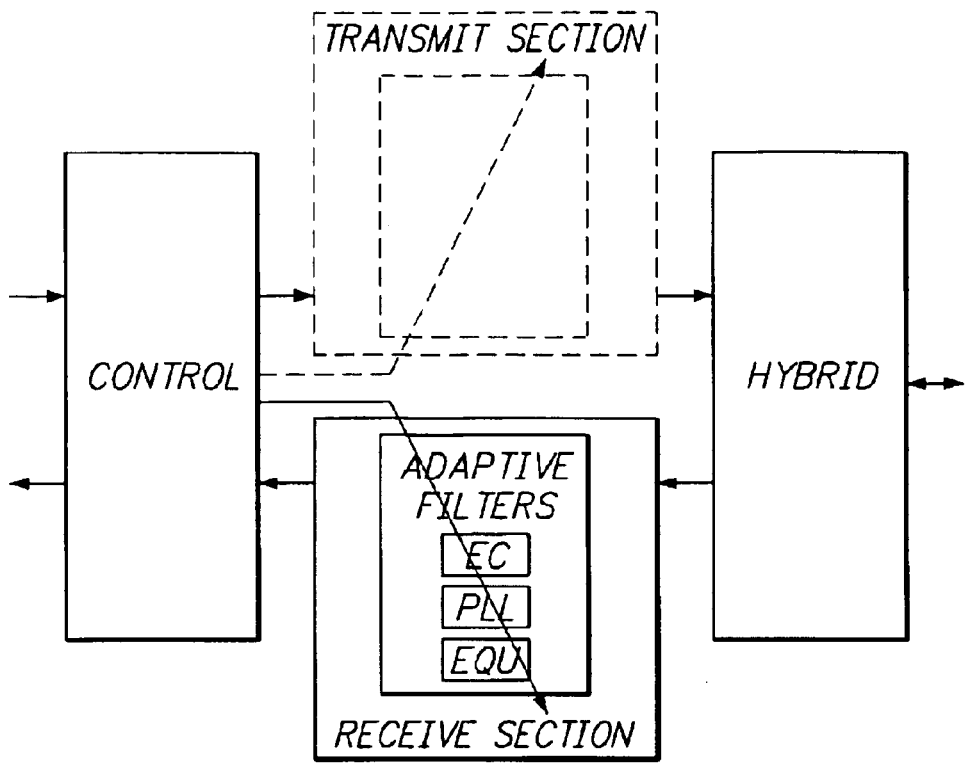
FIG. 1 is a block diagram showing portions of a wireline communications transceiver with which the present invention may be used.

Referring to FIG. 1, a block diagram is shown illustrating portions of a wireline communications transceiver with which the present invention may be used. The wireline communications transceiver includes a control section, a transmit section, a receive section, and a hybrid section. Within the transceiver, particularly the receive section, may be various subsystems that require training by the control section, for example, a PLL (which may be of digital implementation), an echo canceller and an adaptive equalizer. The training of these subsystems is an interdependent process. For example, some initial training of the PLL may be required prior to any other training. This initial training, however, may not achieve as good results as may be obtained following some training of one or more of the other subsystems, i.e., the echo canceller and adaptive equalizer. As described hereinafter, the present training methods allow for coordinated, interdependent training of multiple subsystems, offering the potential of substantially improving overall system performance.

Since ISI, which equalization aims to eliminate, is typically the limiting factor in XDSL communications, the focus of the following description will be equalizer training. The same principles, however, may be applied to the training of various different communications subsystems.

Figure 2:
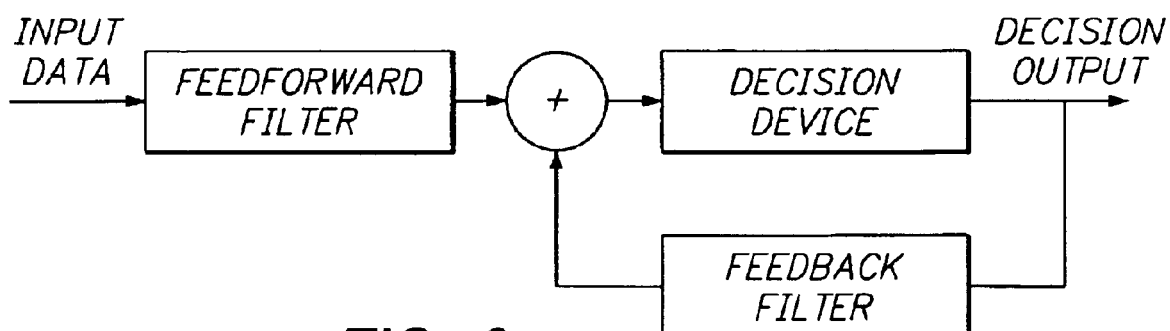
FIG. 2 is a block diagram of a decision feedback equalizer of FIG. 1.
Figure 3A:
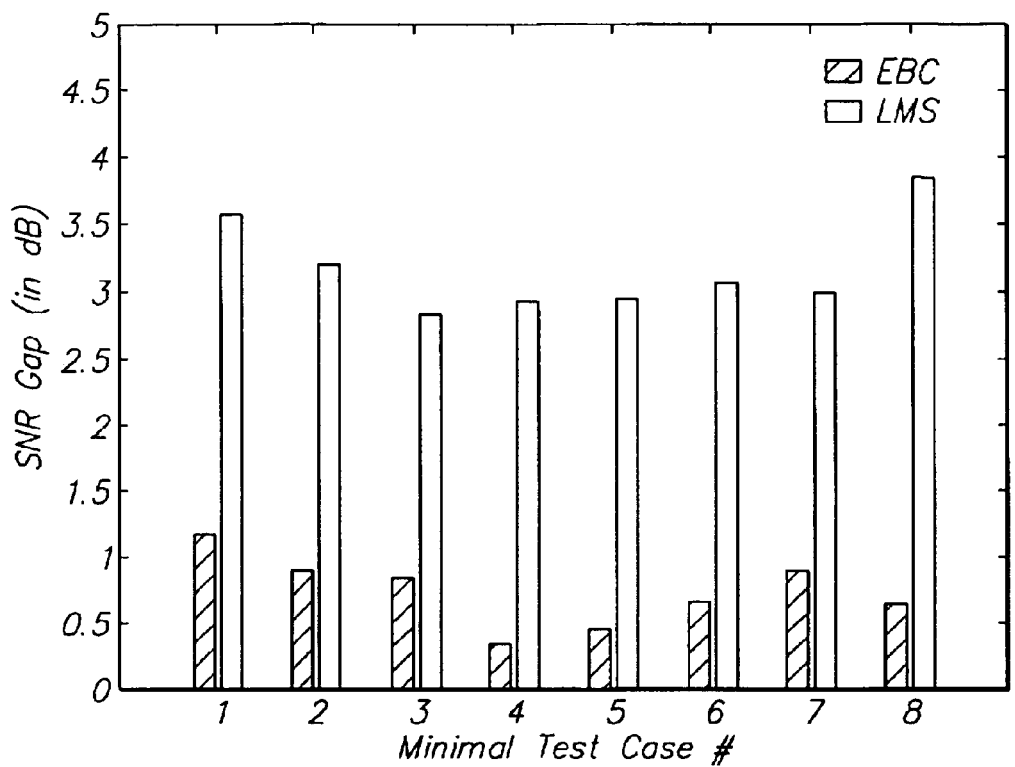
FIGS. 3A–3D are graphs illustrating superior steady-state performance achieved using the RLC-fast algorithm.
Figure 3B:
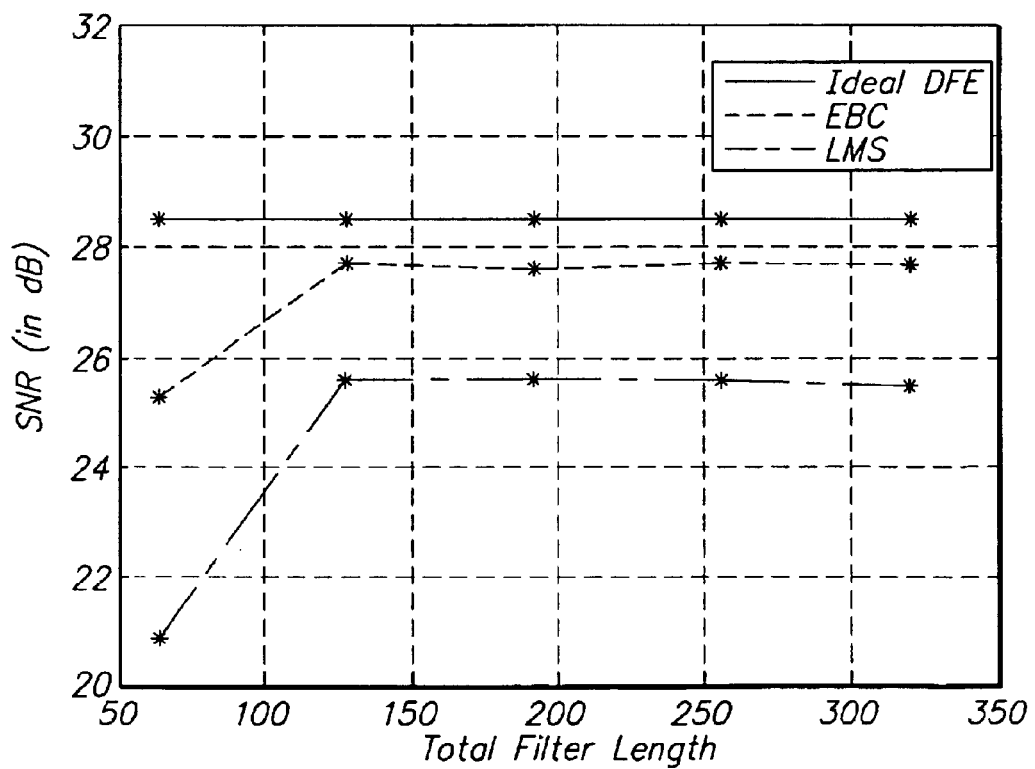
Figure 3C:
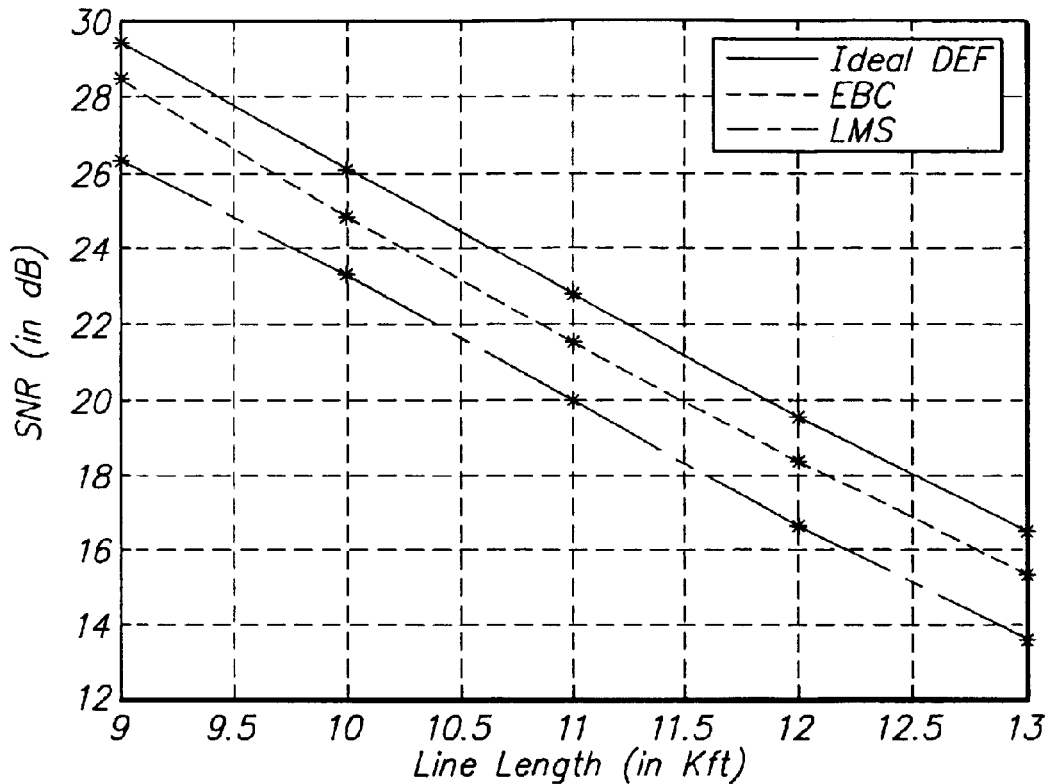
Figure 3D:
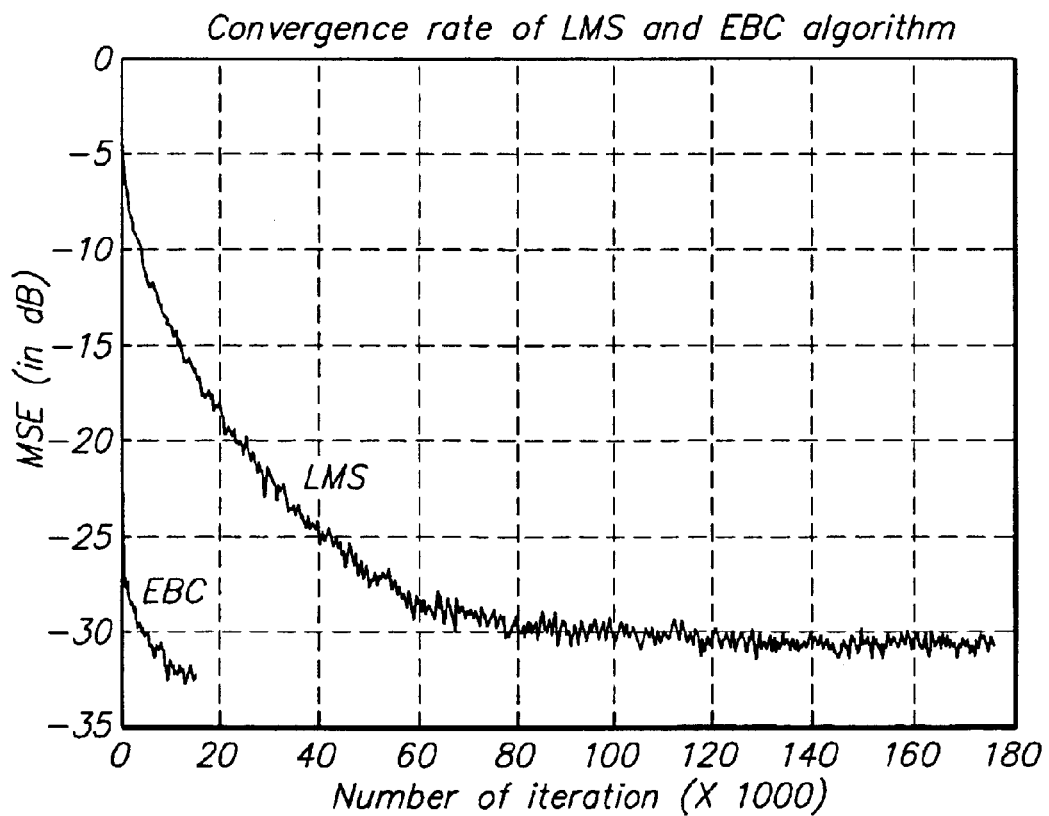

Referring to FIG. 2, a block diagram is shown of an adaptive decision-adaptive equalizer (DFE) suitable for use in the wireline communications transceiver of FIG. 1. An input signal from a communications line (e.g., an HDSL2/G.SHDSL line) is 2× oversampled. The communications line forms the channel for which equalization is to be performed. The samples are input to an adaptive feedforward filter. In conjunction with the filter, a decimation operation is performed. The resulting data stream is applied to a decision element, or "slicer," which produces an output of the equalizer. The output is applied to an adaptive feedback filter, an output of which is summed into the input to the slicer. The DFE structure per se is known. Data decisions are filtered by the feedback filter to eliminate ISI arising from previous pulses. Because the feedback filter compensates for this "past" ISI, the feedforward filter need only compensate for "future" ISI. The equalizer of FIG. 2 differs from conventional equalizers in that the filter adaptation is performed using a variant of RLS, Reinitializable Low Complexity fast least squares (RLC-fast), described hereinafter.

An important, even startling, discovery of the present inventors is that RLS-type algorithms, apart from converging faster, converge to a lower noise floor than the LMS algorithm. That is, better equalization can be performed using the RLS-type algorithms than with LMS. This result is illustrated in FIG. 3. Only in the exacting environment of high-speed, wide-band wireline modems such as HDSL2/G.SHDSL does this important difference come to the fore. In fact, experiments have shown that in this environment, even if an adaptive filter is set to a near-optimal solution obtained using an RLS-type algorithm, if the LMS algorithm is then used, the filter settings will actually diverge from the near-optimal solution. A great incentive therefore exists to use an RLS-type algorithm instead of the prevalent LMS algorithm. Impediments to the use of RLS-type algorithms in this environment include computational complexity and instability.

Although the computational complexity of the fast RLS algorithm is greatly reduced, it remains significant. The computational complexity of adaptation is measured in terms of the number of multiplications and/or divisions required per filter coefficient times the total number of filter coefficients N for the structure. Although the present invention may be used with equalizers of other structures and in other applications of adaptive filters, the invention will be described with respect to the exemplary embodiment of FIG. 2.

Whereas the original fast RLS algorithm requires 28N multiplications and matrix inversion, the computational complexity of the present "RLC-Fast" algorithm is 22N multiplications and involves 2 divisions. This improvement in computational efficiency is achieved by efficiently rewriting the original algorithm. Note that there are algorithms with computational complexity as low as 17N; however, they are very susceptible to error accumulation, and are hard to stabilize without the use of additional correction terms. In the case of a fixed-point equalizer implementation, stability is crucial for overall system reliability. The computational complexity of RLC-fast is reduced without significantly degrading the stability of the algorithm.

Referring to FIG. 4, a chart summarizing the original fast RLS algorithm is shown.

Referring to FIG. 5, a corresponding chart summarizing the RLC-fast algorithm is shown. FIG. 5 follows a different but similar notation than that of FIG. 4, as set forth in the following table:

TABLE 1

| Quantity | Prior Art Algorithm | New Algorithm |
|---|---|---|
| Forward predictor coefficients | $A_{Np}(n)$ | $A_{fast}$ |
| Backward predictor coefficients | $D_{Np}(n)$ | $D_{fast}$ |
|  | $E_{pp}(n)$ | $E_{fast}$ |
| Forward prediction error | $\epsilon_p(n)$ | $e$ |
|  | $\epsilon_p(n)'$ | $e_p$ |
| Backward prediction error | $\eta_p(n)$ | $\eta$ |
|  | $\mu_p(n)$ | $\mu$ |
|  | $m_N(n)$ | $m$ |
|  |  | $b_n, c_n$ where $K_M(n) = \left[\frac{c_n}{b_n}\right]$ |
| Newest entering samples | $\xi_p(n)$ | $eps_2$ |
|  | $S_{MM}, Q_{MM}$ ("rearranging" matrices) | rearrangement performed explicitly |

Derivation of the RLC-fast algorithm from the original algorithm and the computational advantages of the RLC-fast algorithm are described in detail in Appendix B.

A fixed-point implementation of the RLC-fast algorithm is desirable to reduce computational load and hence increase the speed of the algorithm, as well as to avoid the cost and increased power consumption of a floating-point processor. Because of the underlying stability issues of RLS-type algorithms, such a fixed-point implementation must be carefully considered. The binary point cannot be assumed to be at the beginning just after the sign bit—i.e., all numbers within [−1, 1)—to avoid saturation of the variables, since, for some of the internal variables, the actual values may become larger than 1.

Key elements for successful implementation of the RLC-fast algorithm include: (1) Appropriate scaling of the input variables; (2) the position of the binary point for internal variables; (3) efficient internal scaling of the variables after multiplication and division to reduce loss of precision; (4) complete analysis of the dynamic range of various internal variable; and (5) judicious choice of delta ($\delta_i$) and lambda ($\lambda$) for convergence speed and stability.

A currently preferred implementation assumes 32-bit precision for all the variables, with all the numbers being of signed integer form. The integer numbers are given a floating point interpretation in which the leading bit is the sign bit, followed by a 5-bit integer part and a 26-bit fractional part. Multiplication and division are performed assuming the foregoing interpretation of the integer variables. There occur two divisions per update. Both are computed as $1/(1+x)$ instead of $1/x$ to reduce the loss in precision.

A more detailed description of the RLC-fast algorithm is given in Appendix A (implemented in fixed point arithmetic for the DSP TI-C6x).

Due to the high data rate of the HDSL2/G.SHDSL system, for moderate-size problems (N about 100), the RLC-fast algorithm, even with its reduced complexity, poses a high computational burden on a typical processor (say, an X MIPS processor). In many modems, RLC-fast will be executed only once at the start-up phase of the modem and will not be used in the steady-state, which is the normal operating state for the modem.

Hence, although it may be feasible to deploy a high-speed, power-hungry DSP for on-line execution of RLC-fast, such a measure adversely impacts power consumption and may not be cost effective. As a result, off-line implementation of RLC-fast will often be the preferred alternative.

However, off-line implementation itself raises problems. The RLS-type algorithm requires a certain data length in order to converge to a near optimal value. The convergence time is a function of the so-called forgetting factor. An aggressive choice of the forgetting factor can be used to reduce the required data length but at the cost of stability.

A reasonable choice for the forgetting factor may require a long data length (say, 100N) for convergence. This in turn implies a large storage requirement even for a moderate size problem. Once again, if this memory is only used during the start-up phase, a straight-forward implementation wastes large amounts of silicon and results in inefficient design.

Figure 6:
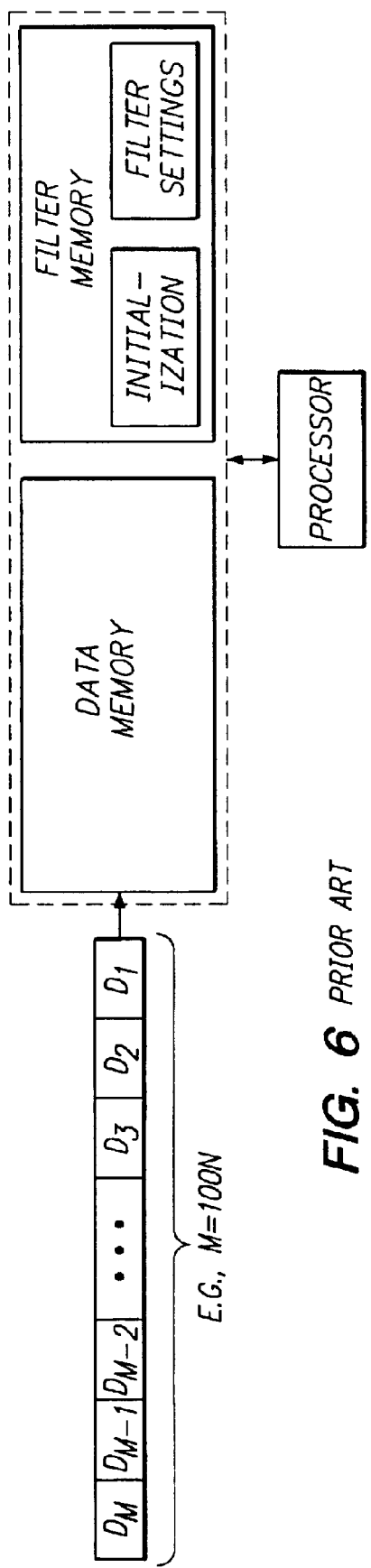
FIG. 6 is a diagram illustrating conventional training using a single contiguous block of data.
Figure 7:
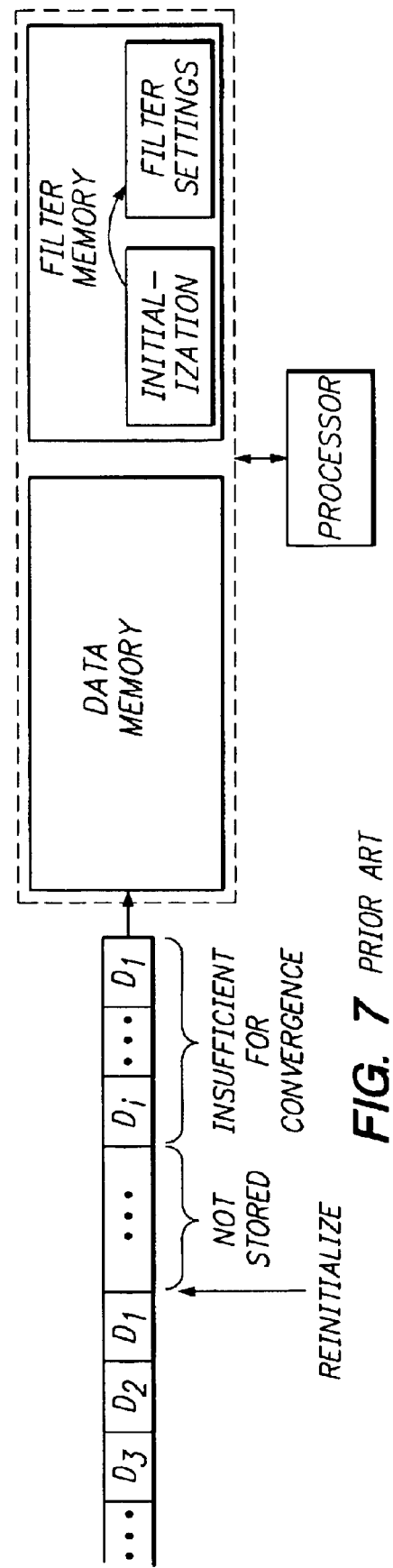
FIG. 7 is a diagram illustrating the inability of conventional adaptation techniques to operate on discontiguous blocks of data.

The original fast RLS algorithm offers no solution to the foregoing problem. Referring more particularly to FIG. 6, the original fast RLS algorithm requires the input data stream to be contiguous. If there is a break in the input data stream, the only way to use the new data in the original approach is to restart the algorithm all over again as illustrated in FIG. 7. Of course, the algorithm can be trained with smaller size blocks of data, but only at the cost of reduced performance. That is, the advantage of FIG. 3 would be sacrificed.

To circumvent the requirement of a contiguous data stream, RLC-fast uses a re-initialization scheme that allows the use of a non-contiguous data block without restarting the algorithm. At start-up, the algorithm is initialized in the usual way. However, the algorithm can be stopped at any time and started at a later time with a new initialization. This manner of operations is illustrated in FIG. 8. No difference in performance is observed if individual data blocks are not too small (say, no smaller than 10N). Hence, storage requirements may be reduced by an order of magnitude (e.g., 10N instead of 100N).

The particulars of re-initialization are illustrated in FIG. 9. Instead of setting the intermediate variables to zero or a scaled identity matrix, the previous values are used for all variables except $X_{fast}$. The variables $A_{fast}$, $F_{fast}$, $K_{fast}$, $b_n$, $D_{fast}$, and $C_{fast}$ are all stored for this purpose.

The foregoing re-initialization capability allows for a store/process mode of operation. More particularly, even with the reduced complexity of RLC-fast, the amount of computation required for real-time processing of moderate size problems can be prohibitive for most DSPs due to the high data rate of the system. To alleviate this problem, a store/process mode of operation is followed in which, during the first half of a cycle, a small block of data (e.g., size 10N) is stored, and during the second half of the cycle, the data is processed to update the filter coefficients. Instead of operating in real-time, since the data is stored, each update need not be finished within the sample time T. Instead, the computation can be distributed over multiple sample periods.

One approach is to partition the computation of the update for each data sample in small enough segments such that an individual segment can be finished in one sample time. The smaller the partition, the less processing is required each sample period. Total time to finish the update increases. Hence, store/process operation, along with partitioning of the update computation, provides a flexible mechanism that allows for trade-off between processing load and total time to process a data block. Without the capability of re-initialization, this flexibility is not obtainable.

The same flexibility may be extended from the adaptive equalizer or other isolated sub-system to the system as a whole, in such as way as to achieve not only great flexibility but also improved performance. In reality, the performance of each sub-system is interdependent on the performance of other sub-systems and should not be viewed in isolation.

Figure 10:
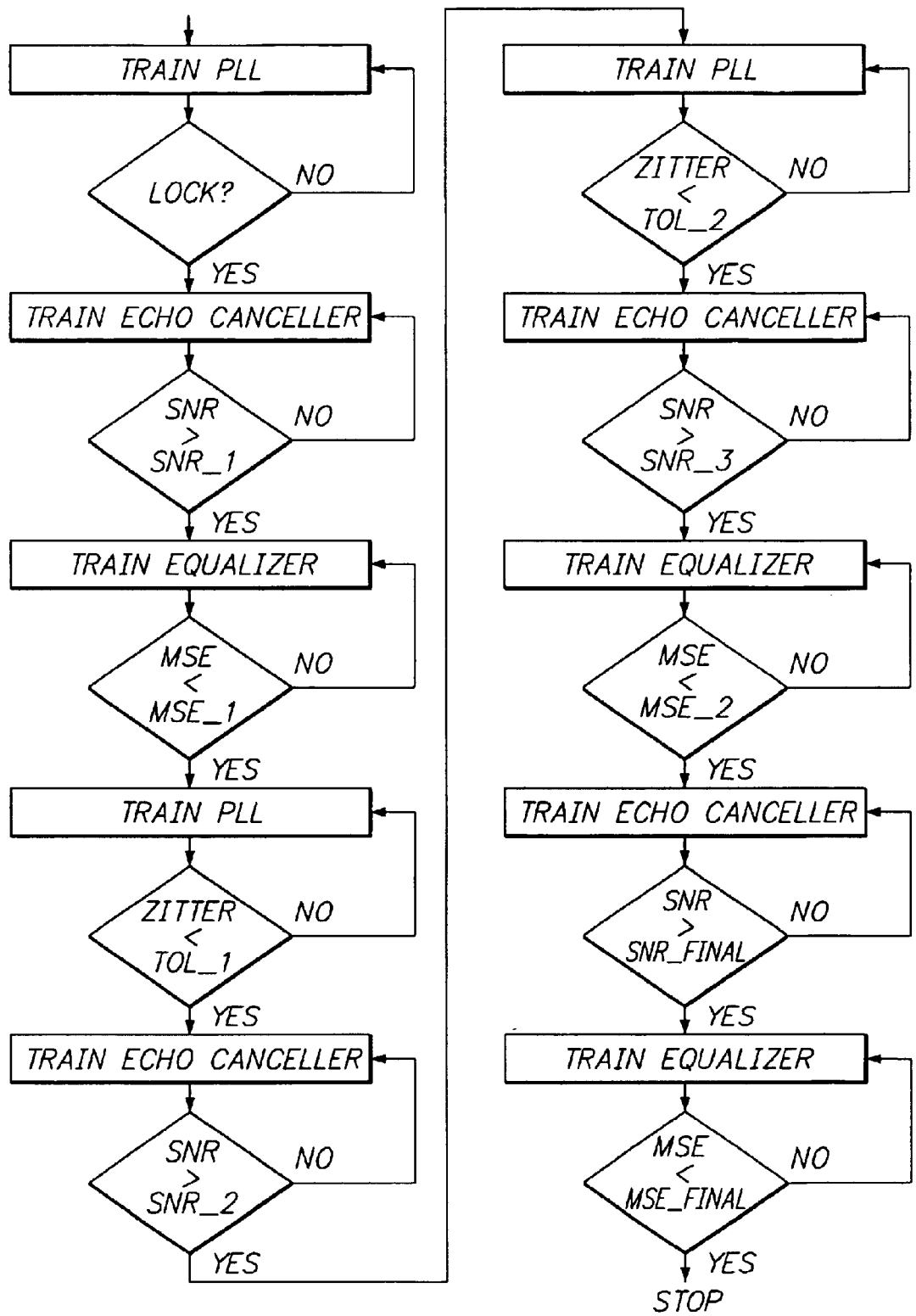
FIG. 10 is a flowchart illustrating cooperative, interdependent training of multiple subsystems in accordance with one aspect of the present invention.

Referring to FIG. 10, for example, the performance of the clock recovery circuit of the PLL block is influenced by the performance of the echo canceller and vice versa. The same is true for the performance of the echo canceller and the equalizer. The better the echo cancellation is, the better the equalizer performance will be. As a consequence, there will be fewer errors in the decision. These more accurate decisions can be used to improve the echo cancellation performance. This improved echo cancellation can be utilized to reduce the zitter performance of the PLL.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

APPENDIX A

A. Detailed Description of EBC-Fastalgo

Step 1  Initialization:
$$A_{fast} = 0, (N \times 3)$$
$$D_{fast} = 0, (N \times 3)$$
$$F_{fast} = \delta_i I, (3 \times 3)$$
$$K_{fast} = 0, (N \times 1)$$
$$X_{fast} = 0, (N \times 1)$$
$$C_{fast} = 0, (N \times 1)$$
$$\text{decision} = 0, (1 \times 1).$$

Step 2  Data Acquisition:
$$p_3 = [X_{fast}(FFE_{LEN} - 2) \; X_{fast}(FFE_{LEN} - 1) \; X_{fast}(N - 1)],$$
$$eps_2 = [y(2); y(1); \text{decision}];$$
$$\text{decision} = \text{txsignal}.$$

Step 3  Update Computation:
$$e = eps_2 + A_{fast}^T X_{fast}.$$
e[0]=eps2[0];
e[1]=eps2[1];
e[2]=eps2[2];
for(ind=0;ind<N;ind++)
{
e[0] += mpy n(A fast [ind],X fast [ind]);
e[1] += mpy n(A fast[ind+N],X fast[ind]);
e[2] += mpy n(A fast[ind+N 2],X fast[ind]);
}
$$A_{fast} = A_{fast} - K_{fast} e^T.$$
for(ind=0;ind<N;ind++)
{
ind2=ind+N;
ind3=ind+N 2;
A fast[ind] -= mpy n(K fast[ind],e[0]);
A fast[ind2] -= mpy n(K fast[ind],e[1]);
A fast[ind3] -= mpy n(K fast[ind],e[2]);
}
$$e_p = eps2 + A_{fast}^T X_{fast}.$$
Equivalently,
$$e_p = e(1 - K_{fast}^T X_{fast}).$$
temp fast=inp(K fast,X fast,N);
temp fast=FIXED ONE–temp fast;
ep[0]=mpy n(temp fast,e[0]);
ep[1]=mpy n(temp fast,e[1]);
ep[2]=mpy n(temp fast,e[2]);
$$F_{fast} = \lambda_t F_{fast}.$$
mat scal(lambda,F fast,MM,F fast);

$$F_{fast} = F_{fast} - (F_{fast} e_p e^T F_{fast}) \frac{1}{(1 + e^T F_{fast} e_p)},$$

$$t_3 = F_{fast} e_p,$$

APPENDIX A-continued

A. Detailed Description of EBC-Fastalgo

We use the following equivalent computation:

$$t_3 = F_{fast} \frac{e_p}{1 + e^T F_{fast} e_p},$$

$$F_{fast} = F_{fast} - t_3 e^T F_{fast},$$

```
mat cvec(F fast,ep,M,temp vecM);
temp fast=inp(e,temp vecM,M);
temp fast=div wor(temp fast+FIXED ONE);
mat scal(temp fast,temp vecM,M,temp vecM);
mat rvec(F fast,e,M,temp vecM1);
outp(temp vecM,temp vecM1,M,temp matM);
for(ind=0;ind<MM;ind++)
{
F fast[ind]=F fast[ind]-temp matM[ind];
}
```

$$temp_{vec} = F_{fast} e_p.$$

```
mat cvec(F fast,ep,M,temp vecM);
```

$$b_n = K_{fast} + A_{fast} * t_3;$$

```
for(ind=0;ind<N;ind++)
{
bn[ind]=K fast[ind];
bn[ind]+=mpy n(A fast[ind],temp vecM[0]);
bn[ind]+=mpy n(A fast[ind+N],temp vecM[1]);
bn[ind]+=mpy n(A fast[ind+N 2],temp vecM[2]);
}
```

$$m = [t_3(1:2); b_n(1:FFE_{LEN} - 2); t_3(3); b_n(FFE_{LEN} + 1:N - 1)].$$

```
m vec[0]=temp vecM[0];
m vec[1]=temp vecM[1];
for(ind=2;ind<FFE LEN;ind++)
{
m vec[ind]=bn[ind-2];
}
m vec[FFE LEN]=temp vecM[2];
for(ind=FFE LEN+1;ind<N;ind++)
{
m vec[ind]=bn[ind-1];
}
```

$$\mu = [b_n(FFE_{LEN} - 1 : FFE_{LEN}); b_n(N)].$$

```
mu[0]=bn[FFE LEN-2];
mu[1]=bn[FFE LEN-1];
mu[2]=bn[N-1];
```

$$X_{fast} = [eps_2(1:2); X_{fast}(1:FFE_{LEN} - 2); eps_2(3); X_{fast}(FFE_{LEN} + 1 : N - 1)].$$

```
for(ind=FFE LEN-1;ind>1;ind--)
{
X fast[ind]=X fast[ind-2];
}
X fast[1]=eps2[1];
X fast[0]=eps2[0];
for(ind=FBE LEN-1;ind>0;ind--)
{
X fast[ind+FFE LEN]=X fast[FFE LEN+ind-1];
}
X fast[FFE LEN]=eps2[2];
```

$$\eta = p_3 + D_{fast}^T X_{fast}.$$

```
eta[0]=p3[0];
eta[1]=p3[1];
eta[2]=p3[2];
for(ind=0;ind<N;ind++)
{
eta[0]+=mpy n(D fast[ind],X fast[ind]);
eta[1]+=mpy n(D fast[ind+N],X fast[ind]);
eta[2]+=mpy n(D fast[ind+N 2],X fast[ind]);
}
```

$$D_{fast} = D_{fast} - m\eta^T (I + \mu\eta^T/(1 - \eta^T\mu)),$$
$$K_{fast} = m - D_{fast}\mu.$$

We use the equivalent computation:
$$K_{fast} = (m - (D_{fast}\mu))/(1 - \eta^T\mu),$$
$$D_{fast} = D_{fast} - K_{fast}\eta^T.$$

```
temp fast=inp(eta,mu,M);
temp fast=div wor(FIXED ONE-temp fast);
for(ind=0;ind<N;ind++)
```

APPENDIX A-continued

A. Detailed Description of EBC-Fastalgo

```
{
ind2=ind+N;
ind3=ind+N 2;
K fast[ind]=m vec[ind];
K fast[ind]-=mpy n(D fast[ind],mu[0]);
K fast[ind]-=mpy n(D fast [ind2],mu[1]);
K fast[ind]-=mpy n(D fast[ind3],mu[2]);
K fast[ind]=mpy n(K fast[ind],temp fast);
}
for(ind=0;ind<N;ind++)
{
ind2=ind+N;
ind3=ind+N 2;
D fast[ind]  -=mpy n(K fast[ind],eta[0]);
D fast[ind2] -=mpy n(K fast[ind],eta[1]);
D fast[ind3] -=mpy n(K fast[ind],eta[2]);
}
            x_est = C_fast X_fast.
xest=inp(X fast,C fast,N);
            error = decision − x_est.
error xest= decision−xest;
        C_fast = C_fast + error * K_fast.
if(((gdat.fastbuffoffset)*2)>FFE LEN)
{
for(ind=0;ind<N;ind++)
{ C fast[ind] +=mpy n(K fast[ind],error xest);
}
}
```

APPENDIX B

Step-by-step derivation of the RLC-fast algorithm from fast algorithm

Step 1 Initialization:
$$A_{fast} = 0, (N \times 3)$$
$$D_{fast} = 0, (N \times 3)$$
$$F_{fast} = \delta_i I, (3 \times 3)$$
$$K_{fast} = 0, (N \times 1)$$
$$X_{fast} = 0, (N \times 1)$$
$$C_{fast} = 0, (N \times 1)$$
$$\text{decision} = 0. (1 \times 1).$$

The only difference is in the definition of $F_{fast}$.
Instead of defining the variable $E_{fast}$, we define its
inverse, i.e., $F_{fast} = E_{fast}^{-1}$. Hence, $\delta_i = 1/\delta$.

Step 2 Data Acquisition:
$$p_3 = [X_{fast}(FFE_{LEN} - 2) X_{fast}(FFE_{LEN} - 1) X_{fast}(N-1)],$$
$$eps_2 = [y(2); y(1); \text{decision}];$$
$$\text{decision} = \text{txsignal}.$$

This phase is identical to the data acquisition phase of fast algorithm.

Step 3 Update Computation:
The first two equations are identical:
$$e = eps_2 + A_{fast}^T X_{fast},$$
$$A_{fast} = A_{fast} - K_{fast} e^T.$$

Fast algorithm:
$$e_p = eps2 + A_{fast}^T X_{fast}.$$

Using the last relation for $A_{fast}$, we write $$A_{fast}^T X_{fast} = (A_{fast} - K_{fast} e^T)^T X_{fast},$$
$$= A_{fast}^T X_{fast} - e K_{fast}^T X_{fast},$$
$$= e - esp_2 - e K_{fast}^T X_{fast},$$

where in the last equation we used the definition of e. Substituting this
expression for $A_{fast}^T X_{fast}$ back to the equation for $e_p$,
we get an equivalent express for $e_p$ as
$$e_p = e(1 - K_{fast}^T X_{fast}).$$

Motivation: Reduction in computation from mN to $N + \overset{''}{m}$.

APPENDIX B-continued

Step-by-step derivation of the RLC-fast algorithm from fast algorithm

Fast algorithm:
$$E_{fast} = \lambda E_{fast} + e_p e^T,$$
$$b_n = K_{fast} + A_{fast} E_{fast}^{-1} e_p,$$
$$c_n = E_{fast}^{-1} e_p,$$

First notice that, $$b_n = K_{fast} + A_{fast} E_{fast}^{-1} e_p,$$
$$= K_{fast} + A_{fast} c_n.$$

Now, $$c_n = E_{fast}^{-1} e_p,$$
$$= (\lambda E_{fast} + e_p e^T)^{-1} e_p,$$
$$= \lambda_i E_{fast}^{-1} \left[ 1 - \frac{e_p e^T \lambda_i E_{fast}^{-1} e_p}{1 + e^T \lambda_i E_{fast}^{-1} e_p} \right],$$

where in the last line we used the matrix inversion lemma and $\lambda_i = 1/\lambda$. Substituting $F_{fast} = E_{fast}^{-1}$ and rearranging, we get $$c_n = \lambda_i F_{fast} \frac{e_p}{1 + e^T \lambda_i F_{fast} e_p}.$$

After resequencing, we obtain $$F_{fast} = \lambda_i F_{fast},$$
$$c_n = F_{fast} \frac{e_p}{1 + e^T F_{fast} e_p},$$
$$F_{fast} = F_{fast} - c_n e^T F_{fast},$$
$$b_n = K_{fast} + A_{fast} c_n.$$

Motivation: Reduction in computation from $mN + 4m^2$ multiplications and an ($m \times m$) matrix inversion to $mN + 4m^2 + 2m$ multiplication and a scaler division. This also improves the stability of the algorithm.
Next, four equations are identical:
$$m = [c_n(1:2); b_n(1:FFE_{LEN} - 2); c_n(3); b_n(FFE_{LEN} + 1 : N - 1)],$$
$$\mu = [b_n(FFE_{LEN} - 1 : FFE_{LEN}); b_n(N)],$$
$$X_{fast} = [eps_2(1:2); X_{fast}(1:FFE_{LEN} - 2); eps_2(3); X_{fast}(FFE_{LEN} + 1 : N - 1)],$$
$$\eta = p_3 + D_{fast}^T X_{fast}.$$
Fast Algorithm:
$$D_{fast} = (D_{fast} - m\eta^T)(I - \mu\eta^T)^{-1},$$
$$K_{fast} = m - D_{fast}\mu.$$
Substituting the first relation for $D_{fast}$ into the second equation and using matrix inversion lemma, we get $$K_{fast} = m - (D_{fast} - m\eta^T)(I - \mu\eta^T)^{-1}\mu,$$
$$= m - (D_{fast} - m\eta^T)\left(I + \frac{\mu\eta^T}{1 - \eta^T\mu}\right)\mu,$$
$$= m - (D_{fast} - m\eta^T)\mu\left(1 + \frac{\eta^T\mu}{1 - \eta^T\mu}\right),$$
$$= m - \frac{(D_{fast} - m\eta^T)\mu}{1 - \eta^T\mu},$$
$$= \frac{m - (D_{fast}\mu)}{1 - \eta^T\mu}.$$

APPENDIX B-continued

Step-by-step derivation of the RLC-fast algorithm from fast algorithm

Now, $$\begin{aligned}
D_{fast} &= (D_{fast} - m\eta^T)(I - \mu\eta^T)^{-1}, \\
&= (D_{fast} - m\eta^T)\left(I + \frac{\mu\eta^T}{1 - \eta^T\mu}\right), \\
&= D_{fast}\left(I + \frac{\mu\eta^T}{1 - \eta^T\mu}\right) - m\eta^T\left(I + \frac{\mu\eta^T}{1 - \eta^T\mu}\right), \\
&= D_{fast} + \frac{D_{fast}\mu\eta^T}{1 - \eta^T\mu} - \left(m\eta^T + \frac{m\eta^T\mu\eta^T}{1 - \eta^T\mu}\right), \\
&= D_{fast} + \frac{D_{fast}\mu\eta^T}{1 - \eta^T\mu} - \frac{m\eta^T}{1 - \eta^T\mu}, \\
&= D_{fast} + \frac{D_{fast}\mu\eta^T - m\eta^T}{1 - \eta^T\mu}, \\
&= D_{fast} - \frac{(m - D_{fast}\mu)}{1 - \eta^T\mu}\eta^T, \\
&= D_{fast} - K_{fast}\eta^T,
\end{aligned}$$

where in the last step we substituted the express for $K_{fast}$. Hence,
$K_{fast} = (m - (D_{fast}\mu))/(1 - \eta^T\mu)$,
$D_{fast} = D_{fast} - K_{fast}\eta^T$.
Motivation: Reduction in computation from $(m + 2)mN + m^2$ multiplications and an $(m \times m)$ matrix inversion to $(2m + 1)N + m$ multiplications and a scaler division.
The last three equation are identical:
$x_{est} = C_{fast}X_{fast}$,
error = decision − $x_{est}$,
$C_{fast} = C_{fast} + \text{error}K_{fast}$.

What is claimed is:

1. A high-speed, broadband, wireline modem including an adaptive equalizer having both a training mode and a decision-directed non-training mode, the adaptive equalizer comprising:

at least one of: a forward path coupled to receive signal samples, the forward path including a forward filter and a decision element, and a feedback path coupled between an output of the decision element and an input of the decision element, the feedback path including a feedback filter; and means for adapting the one of said forward filter and said feedback filter based on a least squares error criterion performed substantially according to the following computation:

$$e_p = e(1 - K^T X_{fast})$$

wherein e is a forward prediction error, K is a Kalmann Gain and $X_{fast}$ is an input vector.

2. The adaptive equalizer of claim 1, further comprising a memory for storing the received signal samples.

3. The adaptive equalizer of claim 1, wherein the means for adapting operates during said decision-directed non-training mode.

4. The adaptive equalizer of claim 1, wherein adaptation is performed using fixed-point arithmetic operations.

5. A high-speed, broadband, wireline modem including an adaptive equalizer having both a training mode and a decision-directed non-training mode, the adaptive equalizer comprising:

at least one of: a forward path coupled to receive signal samples, the forward path including a forward filter and a decision element, and a feedback path coupled between an output of the decision element and an input of the decision element, the feedback path including a feedback filter; and means for adapting the one of said forward filter and said feedback filter based on a least squares error criterion performed substantially according to the following computation:

$$F_{fast} = \lambda_i F_{fast}$$

$$c_n = F_{fast} \frac{e_p}{1 + e^T F_{fast} e_p}$$

$$F_{fast} = F_{fast} - c_n e^T F_{fast}$$

$$b_n = K_{fast} + A_{fast} c_n$$

wherein $F_{fast}$, $A_{fast}$ and c are filter coefficients, e is a forward error prediction, $\lambda$ is an error criterion, and b is a backward error predictor.

6. The adaptive equalizer of claim 5, further comprising a memory for storing said received signal samples.

7. The adaptive equalizer of claim 5, wherein the means for adapting operates during said decision-directed non-training mode.

8. The adaptive equalizer of claim 5, wherein adaptation is performed using fixed-point arithmetic operations.

9. A high-speed, broadband, wireline modem including an adaptive equalizer having both a training mode and a decision-directed non-training mode, the adaptive equalizer comprising:

at least one of: a forward path coupled to receive signal samples, the forward path including a forward filter and a decision element, and a feedback path coupled between an output of the decision element and an input of the decision element, the feedback path including a feedback filter; and means for adapting the one of said forward filter and said feedback filter based on a least squares error criterion performed substantially according to the following computation:

$$K_{fast} = (m - (D_{fast}\mu))/(1 - \eta'\mu)$$

$$D_{fast} = D_{fast} - K_{fast}\eta'$$

wherein $K_{fast}$ is a Kalmann Gain, $D_{fast}$ is a backward predictor coefficient and m, $\mu$, and $\eta$ are backward prediction errors.

10. The adaptive equalizer of claim 9, further comprising a memory for storing said received signal samples.

11. The adaptive equalizer of claim 9, wherein the means for adapting operates during said decision-directed non-training mode.

12. The adaptive equalizer of claim 9, wherein adaptation is performed using fixed-point arithmetic operations.

* * * * *